Dec. 29, 1931. W. A. CROSTA 1,838,364

HOSE CLAMP

Original Filed June 3, 1929

Inventor
William A. Crosta
By Wooster & Davis
Attorneys.

Patented Dec. 29, 1931

1,838,364

UNITED STATES PATENT OFFICE

WILLIAM A. CROSTA, OF STAMFORD, CONNECTICUT

HOSE CLAMP

Application filed June 3, 1929, Serial No. 367,967. Renewed June 11, 1931.

This invention relates to a hose clamp, and has for an object to provide an improved clamp for clamping a flexible hose, such as a rubber or fibre hose about a metal nipple or coupling to make a tight connection between the two, and which clamp will be of a very simple construction so that it may be manufactured and sold at relatively low cost.

It is also an object of the invention to provide a hose clamp of this character which may be applied without the use of special tools but may be applied by a nail, a screw driver, or a similar tool so that it may be quickly and easily applied, and when applied it is tightly clamped about the hose to make a fluid proof joint, and when so clamped is permanently applied so that there will be no danger of its working loose or becoming unclamped in use.

With the foregoing and other objects in view, the invention consists in certain novel features of construction and arrangement of parts as will be more fully disclosed in connection with the accompanying drawings.

In the drawings.

Figure 1:
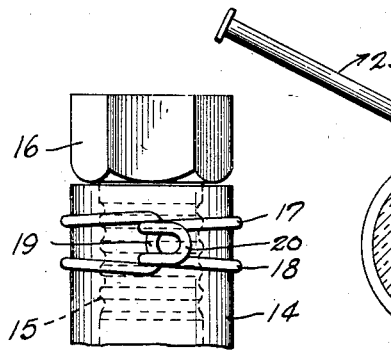
Fig. 1 is a side elevation of an end of a flexible hose and a section of a coupling showing one form of my improved clamp applied thereto.
Figure 2:
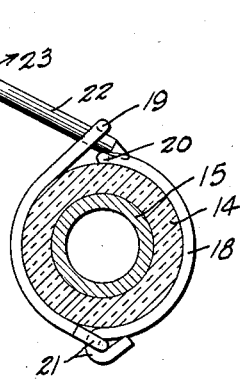
Fig. 2 is a transverse section of the hose showing the clamp and a nail for applying it in the first position.
Figure 3:
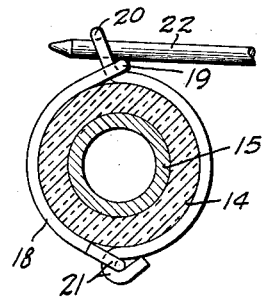
Fig. 3 is a similar section showing the next position with the narrower loop drawn through the larger.
Figure 4:
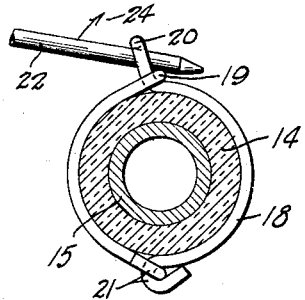
Fig. 4 is a similar section showing the nail or applying instrument reversed for the next operation.
Figure 5:
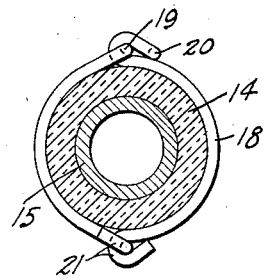
Fig. 5 is a similar section showing the clamp completely applied.

An end of a piece of flexible hose is shown at 14, such for example as a garden hose of fibre and rubber construction, adapted to receive the corrugated neck 15 of a coupling 16. In Figs. 1 to 5 the clamp is made of a piece of wire bent to form two spaced ring portions 17 and 18 to be clamped about the hose, the free ends of these ring portions being connected by bars 19 and 20 to form loops of different widths so that the narrower may be drawn through the wider. The free ends of the piece of wire are connected by eyes 21. In applying the clamp to the hose the ring portions 17 and 18 are placed about the hose in the position of Fig. 2. Then any suitableable instrument such as a nail 22, screw driver or the like, is inserted through the larger loop under the bar 19 and over the bar 20 as indicated in Fig. 2. Then by swinging it over to the right as indicated by the arrow 23, to the position of Fig. 3 the smaller loop 20 is drawn through the larger loop under the bar 19 and the wire bent somewhat as indicated in Fig. 3. This draws the wire of the clamp tightly about the hose pressing the hose tightly about the neck of the coupling, making a very tight joint. To complete the operation however, the instrument is withdrawn after Fig. 3 and inserted through the smaller loop 20 from the opposite direction and over the bar 19 as indicated Fig. 4, and then again by swinging it to the right, as shown by the arrow Fig. 4, the smaller loop 20 is folded down over the bar 19 as indicated in Figs. 1 and 5. This completes the operation of applying the clamp, and it will be noted that the clamp is permanently set and very tightly drawn and clamped about the hose, and that it may be set with any instrument which may be handy, such as a nail, screw driver, or the like, and therefore, no special tool is necessary.

Figure 6:
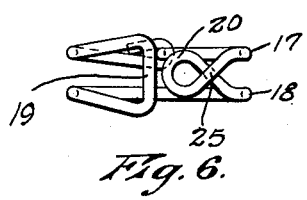
Fig. 6 is a plan view of a modified form of clamp.

In Fig. 6 the clamp is the same as shown in Figs. 1 and 5 except that adjacent the smaller loop 20 the side bars 17 and 18 are crossed as shown at 25. This forms a backing for the end of the instrument when applying the clamp to the hose and helps to prevent injury to the hose by the point of the instrument. It also assists in drawing the smaller loop and holding it while performing the second operation, illustrated in Figs. 4 and 5, as the point of the instrument may engage back of the cross, and it helps to draw the clamp even tighter about the hose.

Figure 8:
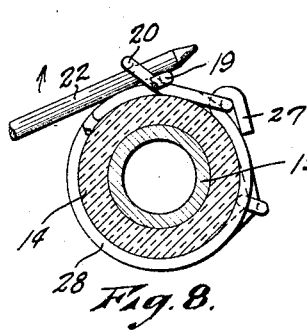
Fig. 8 is a transverse section of a piece of hose showing the clamp of Fig. 7 being applied.
Figure 7:
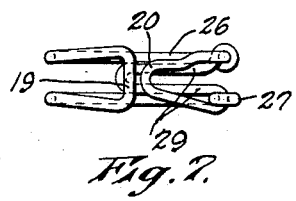
Fig. 7 is a similar view of a somewhat different form of clamp.

The clamp of Figs. 7 and 8 is somewhat different in that one side wire 26 after forming the smaller loop 20 is passed through an eye 27 on the opposite wire 28 and is then folded back and upon itself under the loop 20 as shown at 29 to form a support under the loop 20 to engage the end of the instrument when applying the clamp to a hose to prevent the end of the instrument digging into the hose. It also forms a continuous clamp to engage the hose throughout the entire circumference of the hose as indicated in Fig. 8.

Figure 9:
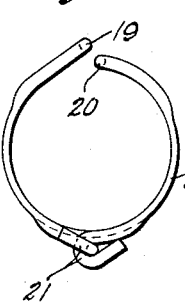
Fig. 9 is an edge elevation of a slightly modified form of clamp.
Figure 10:
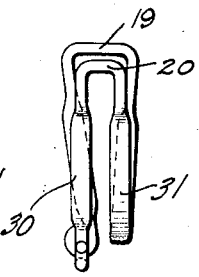
Fig. 10 is a side elevation thereof.

The clamp of Figs. 9 and 10 is the same as the other clamps except that the body portions 30 and 31 which clamp against the surface of the hose are flattened so as to have a wider bearing surface on the hose and will have a less tendency to cut the hose if it should be made of somewhat softer material.

Figure 11:
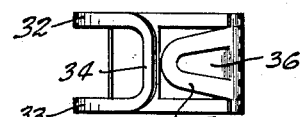
Figs. 11, 12 and 13 are top, side and end views respectively of another modified form of clamp.
Figures 12, 13:
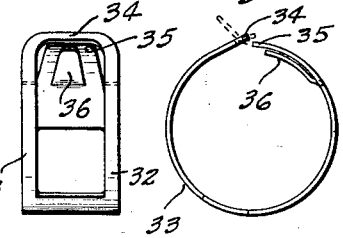

In Figs. 11, 12 and 13 I have shown how this clamp may be stamped from sheet metal. This clamp has spaced bars 32 and 33 to clamp about the hose and at their free ends are joined by the bar 34 forming the larger loop corresponding with the loop 19 in the other forms. At the opposite ends of the members 32 and 33 however, the metal is cut tapered to form a narrower loop 35 corresponding with the loop 20 of the first form, and the tongue 36 cut from the inside of this loop is left in position on the loop as indicated, it being attached at its wider end. In this form the loop 35 is drawn through and folded over the bar of the larger loop 34, the same as in the other form, while the tongue 36 supports the pointed end of the instrument used in setting the clamp and prevents it digging in the surface of the hose.

Having thus set forth the nature of my invention, what I claim is:

1. A hose clamp comprising an open circular clamping member or embracing a hose and having loops at its opposite ends of different widths, the two sides of the narrower loop being crossed at a point spaced from the end of the loop, said narrower loop being capable of being drawn through the wider loop and folded over the bar thereof to clamp the member about a hose and form a permanent connection between the free ends of the member.

2. A hose clamp comprising two spaced open ring sections connected at their free ends to form loops of different widths, the side members being crossed adjacent the narrower loop, the narrower loop being capable of being drawn through the wider loop and folded over the bar thereof to clamp the member about a hose and form a permanent connection between the free ends of the clamp.

3. A hose clamp comprising an open circular clamping member for embracing a hose and having loops at its opposite ends of different widths, each side of the narrower loop being connected with the opposite side at a point spaced from the free end of the loop to form a support to be engaged by a tool, said narrower loop being capable of being drawn through the wider loop by said tool and folded over the bar of the wider loop to clamp the member about a hose and form a permanent connection between the free ends of the member.

In testimony whereof I affix my signature.

WILLIAM A. CROSTA.